United States Patent
Yuan

(10) Patent No.: US 7,589,830 B2
(45) Date of Patent: Sep. 15, 2009

(54) METHOD FOR TESTING A LENS AND POSITIONING THE LENS RELATIVE TO AN IMAGE SENSOR

(75) Inventor: Kun-I Yuan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/202,549

(22) Filed: Sep. 2, 2008

(65) Prior Publication Data

US 2009/0185174 A1    Jul. 23, 2009

(51) Int. Cl.
*G01M 11/00* (2006.01)
(52) U.S. Cl. .................................. 356/124.5
(58) Field of Classification Search ........................ None
See application file for complete search history.

(56) References Cited

U.S. PATENT DOCUMENTS

| | | | | |
|---|---|---|---|---|
| 3,930,732 A | * | 1/1976 | Holly | 356/124.5 |
| 5,075,883 A | * | 12/1991 | Friedman et al. | 702/109 |
| 5,818,572 A | * | 10/1998 | Pappas et al. | 356/124.5 |
| 5,966,209 A | * | 10/1999 | Cheng et al. | 356/124.5 |
| 6,195,159 B1 | * | 2/2001 | MacDonald et al. | 356/123 |
| 6,876,443 B2 | * | 4/2005 | Barth et al. | 356/124.5 |
| 6,900,884 B2 | * | 5/2005 | Alderson et al. | 356/124.5 |
| 6,967,678 B2 | * | 11/2005 | Baker et al. | 348/219.1 |
| 2007/0133969 A1 | * | 6/2007 | Ish-Shalom et al. | 396/89 |
| 2008/0075446 A1 | * | 3/2008 | Utz | 396/133 |

\* cited by examiner

*Primary Examiner*—Gregory J Toatley, Jr.
*Assistant Examiner*—Gordon J Stock, Jr.
(74) *Attorney, Agent, or Firm*—Andrew C. Cheng

(57) ABSTRACT

A method for testing and positioning a lens includes determining whether a modulation transfer function (MTF) value of the lens for an object at a first object distance is not less than a first required MTF value and whether another MTF value of the lens for an object at a secondary object distance is not less than a secondary required MTF value. A first MTF curve is plotted according to optical resolution measurements for the object at the first object distance, and the secondary MTF curve is obtained by offsetting the first MTF curve. The secondary MTF curve can approximately represent optical resolution measurements for the object at a secondary object distance. The method can determine an ideal range of positions of the lens relative to an image sensor.

13 Claims, 2 Drawing Sheets

METHOD FOR TESTING A LENS AND POSITIONING THE LENS RELATIVE TO AN IMAGE SENSOR

BACKGROUND

1. Technical Field

The present invention relates to methods for testing lenses, and particularly, to a method for testing an optical resolution of a lens and positioning the lens relative to an image sensor.

2. Description of Related Art

The ongoing development in microcircuitry and multimedia technology has made still and digital camera modules popular and widely used. Nowadays, various electronic devices such as cell phones and personal digital assistants are equipped with camera modules. Continuous improvements in the quality and resolution of the camera modules are demanded by consumers.

Lenses and image sensors are critical components in camera modules. The position of a lens relative to an image sensor is very important, particularly for a camera module without an auto-focus function (e.g., the lens and the image sensor are both fixed). A distance between a lens and an object is called an object distance. When a lens is at a position where it optimally projects light to an image sensor (i.e., the lens is at a focus state relative to the image sensor), a distance between the lens and the image sensor is called an image distance. When the quality of a lens is tested, the lens typically goes through at least two optical resolution measurements, each of which is scaled to a modulation transfer function (MTF) value. For example, it may be required that a lens satisfy both a first and a secondary required MTF values for a first and a secondary object distances. That is, it is necessary that each MTF value of the lens for an object at different object distances is not less than the respective required MTF value.

Typical methods for testing the optical resolution involve two imaging objects at two different object distances, or a motor for moving an imaging object to two different object distances. The process is complicated because additional equipment or mechanisms are required to perform the test.

Therefore, a new method for testing a lens is desired to overcome the above-described problems.

SUMMARY

In one embodiment, the method includes determining whether an MTF value of the lens for an object at a first object distance and another MTF value of the lens for the object at a secondary object distance are not less than a corresponding first required MTF value and a secondary required MTF value, to determine an ideal position of the lens relative to an image sensor.

Detailedly, the method includes the following blocks, in no particular fixed order. First, an object and an image sensor are provided, and a lens is positioned at a first position between the object and the image sensor, for a distance between the lens and the object to be a first object distance and a distance between the lens and the image sensor to be a corresponding first image distance. Next, a first MTF value for the lens at the first position of the object is obtained, and the lens is micro-moved frontward and backward relative to the first position to obtain secondary MTF values for the lens of the object. The first MTF value and the secondary MTF values form a first MTF curve. The first MTF curve is offset a predetermined distance to form a secondary MTF curve. The predetermined distance is a residual value (i.e., difference) between the first image distance and a secondary image distance corresponding to a secondary object distance. A line representing a first required MTF value and a line representing a secondary required MTF value line are marked. If the first MTF curve intersects the first required MTF value line and the secondary MTF curve intersects the second secondary required MTF value line, then it is determined whether the first MTF value is not less than the first required MTF value and not less than the secondary required MTF value. If the first MTF value is determined as satisfying the above criteria, then it is determined whether a desired intersected area exists. The desired intersected area is defined as an intersection of an area under the first and secondary MTF curves, wherein the first required MTF value line and the secondary required MTF value line both intersect the intersected area. If the desired intersected area exists, an ideal position of the lens relative to the image sensor is determined in accordance with a portion of the intersected area between the first and secondary MTF curves and the greater of the first and secondary required MTF values.

Other novel features and advantages will become more apparent from the following detailed description of various embodiments when taken in conjunction with the accompanying drawings.

BRIEF DESCRIPTION OF THE DRAWINGS

Many aspects of the method can be better understood with reference to the following drawings. The components in the drawings are not necessarily drawn to scale, the emphasis instead being placed upon clearly illustrating the principles of the present method.

DETAILED DESCRIPTION OF EMBODIMENTS

Embodiments of the present method will now be described in detail below and with reference to the drawings.

Figure 1:
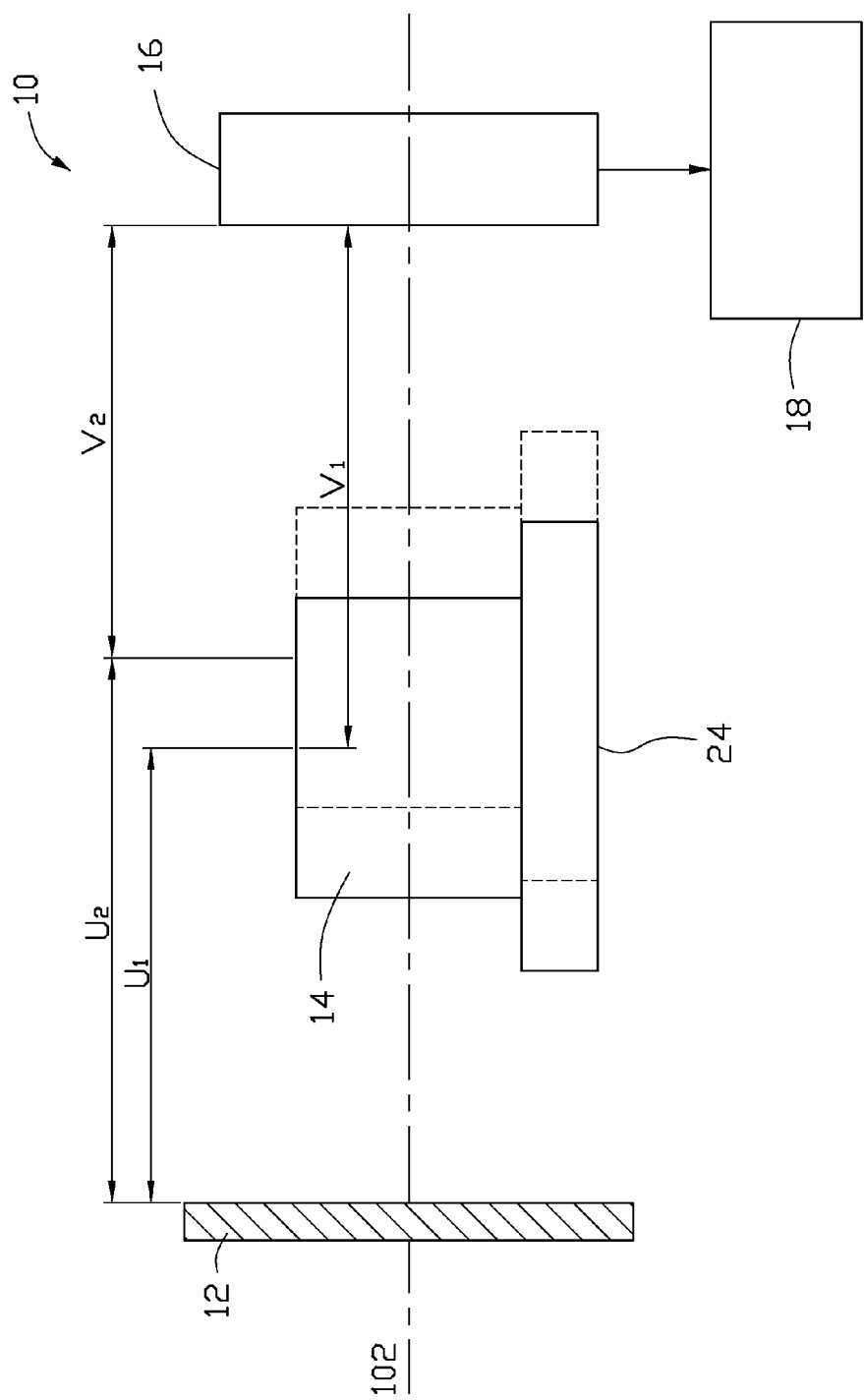
FIG. 1 is a schematic view of an exemplary lens testing apparatus used in an embodiment of the present method for testing and positioning a lens.

FIG. 1 shows an exemplary lens testing apparatus 10 used in one embodiment of a method for testing and positioning a lens 14. The testing apparatus 10 is configured to determine whether an MTF value of the lens 14 for an object at a first object distance and another MTF value of the lens 14 for an object at a secondary object distance are not less than a first required MTF value and a secondary required MTF value to determine a position of the lens relative to an image sensor. If either of the MTF values is less than the corresponding first or secondary required MTF values, then the lens 14 should be considered as unsatisfactory and be reprocessed or discarded. Further, if the lens 14 is satisfactory, the testing apparatus 10 can be used to determine an ideal position of the lens 14 relative to the image sensor.

The testing apparatus 10 includes an object 12, an image sensor 16, a supporter 24 positioned between the object 12 and the image sensor 16, and a computer 18 coupled to the image sensor 16. The lens 14 is arranged on the supporter 24 and faces the object 12. A central axis 102 of the lens 14 is substantially coaxial with a central axis of the object 12 and a central axis of the image sensor 16.

The object 12 has a number of line pair patterns (not labeled) comprised of alternating black and white lines. The black and white lines provide different light signals to the lens 14. The image sensor 16 receives different light intensities corresponding to the different light signals passing through the lens 14, and communicates the different light intensities to the computer 18. The computer 18 processes the different light intensities according to an MTF to obtain an MTF value. The MTF can be expressed by Formula 1 below:

$$MTF = (I_{max} - I_{min})/(I_{max} + I_{min}) \quad (1)$$

where $I_{max}$ represents a light intensity corresponding to the light signals of the white lines, and $I_{min}$ represents a light intensity corresponding to the light signals of the black lines.

The MTF value from the MTF is between 0 and 1. An MTF value of the lens 14 close to 1 indicates a high quality image received by the image sensor 16. An MTF value of the lens 14 close to 0 indicates a low quality image received by the image sensor 16.

A best quality image received by the image sensor 16 is achieved when a distance between the lens 14 and the image sensor 16 is equal to an image distance corresponding to an object distance between the object 12 and the lens 14. That is, an MTF value of the lens 14 is greatest when the lens 14 is at focus state relative to the image sensor 16. In contrast, when a distance between the lens 14 and the image sensor 16 is deviated from an image distance corresponding to an object distance between the object 12 and the lens 14 (i.e., if the lens 14 is not at a focus state relative to the image sensor 16), a lower MTF value is yielded. MTF values decrease from the maximum MTF value when the distance between the lens 14 and the image sensor 16 is increased or decreased from the image distance corresponding to an object distance between the object 12 and the lens 14.

The object distance and the distance between the lens 14 and the image sensor 16 both can be further adjusted to focus and deviate the focus of the lens 14. When the adjusting distance is far less than a focal length of the lens 14, for example, less than one twentieth of a focal length of the lens 14, MTF values of the lens 14 at a readjusted focus state and a corresponding subsequent deviated focus state are almost the same as those of the lens 14 at the immediately prior adjusted focus state and corresponding subsequent deviated focus state, respectively.

Figure 2:
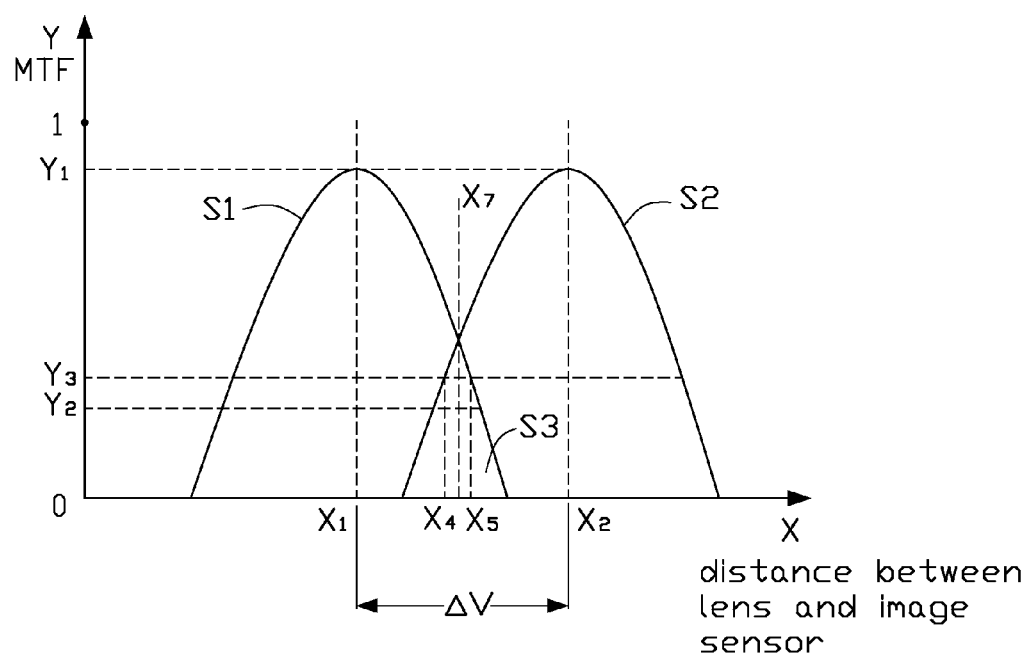
FIG. 2 is a schematic view of MTF curves obtained by the method of FIG. 1.

Also referring to FIG. 2, the lens 14, for example, is required to satisfy an MTF value for an object at a first object distance $U_1$ which is not less than a first required MTF value $Y_2$, and an MTF value for an object at a secondary object distance $U_2$ which is not less than a secondary required MTF value $Y_3$.

An embodiment of the method for testing and positioning the lens 14 comprises:

(1) positioning the object 12 and the image sensor 16;

(2) positioning the lens 14 at a first position between the object 12 and the image sensor 16 such that a distance between the lens 14 and the object 12 is the first object distance $U_1$ and a distance between the lens 14 and the image sensor 16 is a corresponding first image distance $V_1$. The first image distance $V_1$ is derived from an imaging formula expressed by Formula 2 below:

$$1/U + 1/V = 1/F \text{ or } V = (F)(U)/(U-F) \quad (2)$$

where F is a known focus parameter of the lens 14;

(3) obtaining a first MTF value $Y_1$ for the lens 14 of the object 12 with the lens 14 at the first position;

(4) micro-moving the lens 14 frontward and backward relative to the first position along the central axis 102 to obtain a number of secondary positions and recording a number of secondary MTF values with the lens 14 at the secondary positions, respectively;

(5) plotting the first MTF value $Y_1$ and the series of secondary MTF values with respect to the corresponding number of positions to form a first MTF curve S1;

(6) offsetting the first MTF curve S1 by a predetermined distance $\Delta V$ (as illustrated in FIG. 2, $\Delta V = X2 - X1$) to form a secondary MTF curve S2. The predetermined distance $\Delta V$ is determined by a residual value (i.e., difference) between the first image distance $V_1$ and a second secondary image distance $V_2$ corresponding to the secondary object distance $U_2$. The second secondary image distance $V_2$ is also accurately obtained from Formula 2, expressed above;

(7) marking a line representing the first required MTF value $Y_2$ and a line representing the secondary required MTF value $Y_3$;

(8) determining whether the first MTF curve S1 intersects the first required MTF value $Y_2$ line and whether the secondary MTF curve S2 intersects the second secondary required MTF value $Y_3$ line, to determine whether the first MTF value $Y_1$ is not less than the first required MTF value $Y_2$ and is not less than the secondary required MTF value $Y_3$. If the first MTF value $Y_1$ is less than the first required MTF value $Y_2$ or less than the secondary required MTF value $Y_3$, then the lens 14 is unsatisfactory and the method is finished; and (9) determining whether the secondary MTF curve S2 intersects the first MTF curve S1. If an intersected area S3 is defined as an intersection of an area under the first and secondary MTF curves S1, S2, and if the first required MTF value $Y_2$ line and the second secondary required MTF value $Y_3$ line both intersect the intersected area S3, a portion of the intersected area S3 between the first and secondary MTF curves S1, S2 and the greater of the first required MTF value $Y_2$ line and the secondary required MTF value $Y_3$ line indicates an ideal range for the position of the lens 14. To illustrate, in FIG. 2, a position between the positions X4 and X5 is in the ideal range for positioning the lens 14 relative to the image sensor 16 in an optical assembly such as a camera module. This is because the lens 14 at that position corresponds to the MTF values at the first and secondary object distances $U_1$, $U_2$ that are both greater than or equal to the corresponding first and second secondary required MTF values $Y_2$, $Y_3$. More particularly, the position X7 is the ideal position within the ideal range because the MTF value at such position is the highest among all the positions within the portion of the intersected area S3.

According to the above-described method, the first and secondary MTF curves S1, S2 are obtained. After tracing the first MTF curve S1 according to optical resolution measurements for the object 12 at the first object distance $U_1$, the second secondary MTF curve S2 can be obtained by offsetting the first MTF curve S1 a predetermined distance. The predetermined distance is a residual value between the first image distance corresponding to the first object distance $U_1$ and the secondary image distance corresponding to the secondary object distance $U_2$. The secondary MTF curve S2 can approximately represent optical resolution measurements for the object 12 at the second secondary object distance $U_2$ when the predetermined distance is far less than the focal length of the lens 14, for example, less than one twentieth of the focal length of the lens 14. Therefore, two objects 12 or movement of the object 12 can be avoided. In addition, once the intersected area S3 is defined between the first and secondary MTF curves S1, S2, and the first required MTF value $Y_2$ line and the secondary required MTF value $Y_3$ line both intersect the intersected area S3, the ideal position for positioning the lens 14 relative to the image sensor 16 can be easily determined from the intersected area S3.

It is understood that the above-described embodiments including methods are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A method for testing a lens, the method comprising:
providing an object and an image sensor, and positioning a lens at a first position between the object and the image sensor such that a distance between the lens and the object is a first object distance and a distance between the lens and the image sensor is a first image distance corresponding to the first object distance;
obtaining a first modulation transfer function value for the lens with the lens at the first position;
micro-moving the lens frontward and backward relative to the first position along a central axis of the lens to obtain a plurality of secondary positions of the lens and recording a plurality of secondary modulation transfer function values with the lens at the secondary positions, respectively;
plotting the first modulation transfer function value and the plurality of secondary modulation transfer function values to form a first modulation transfer function curve;
offsetting the first modulation transfer function curve a predetermined distance to form a secondary modulation transfer function curve, wherein the predetermined distance is a residual value between the first image distance and a secondary image distance corresponding to a secondary object distance;
marking a line representing a first required modulation transfer function value and a line representing a secondary required modulation transfer function value;
determining whether the first modulation transfer function curve intersects the first required modulation transfer function value line and whether the secondary modulation transfer function curve intersects the secondary required modulation transfer function value line to determine whether the first modulation transfer function value is not less than the first required modulation transfer function value and not less than the secondary required modulation transfer function value; and
in response to determining at least one of that the first modulation transfer function value is less than the first required modulation transfer function value and that the first modulation transfer function value is less than the secondary required modulation transfer function value, determining that the lens is unsatisfactory.

2. The method of claim 1, wherein the object comprises a plurality of line pair patterns, and each of the line pair patterns comprises alternating black and white lines.

3. The method of claim 1, wherein each of the secondary modulation transfer function values is obtained by micro-moving the lens frontward or backward to a deviated focus state.

4. The method of claim 1, wherein the first modulation transfer function value and each of the plurality of secondary modulation transfer function values are calculated from a modulation transfer function performed by a computer coupled to the image sensor.

5. The method of claim 1, wherein the residual value between the first image distance and the secondary image distance is less than one twentieth of a known focal length of the lens.

6. The method of claim 1, wherein each of the first image distance and the secondary image distance is calculated according to the formula: $1/U+1/V=1/F$, where V is the first image distance or the secondary image distance, U is the corresponding first object distance or secondary object distance, and F is a known focus parameter of the lens.

7. A method for testing a lens and positioning the lens relative to an image sensor, the method comprising:
providing an object and an image sensor, and positioning a lens at a first position between the object and the image sensor such that a distance between the lens and the object is a first object distance and a distance between the lens and the image sensor is a first image distance corresponding to the first object distance;
obtaining a first modulation transfer function value for the lens with the lens at the first position;
micro-moving the lens frontward and backward relative to the first position along a central axis of the lens to obtain a plurality of secondary positions of the lens and recording a plurality of secondary modulation transfer function values with the lens at the secondary positions, respectively;
plotting the first modulation transfer function value and the plurality of secondary modulation transfer function values to form a first modulation transfer function curve;
offsetting the first modulation transfer function curve a predetermined distance to form a secondary modulation transfer function curve, wherein the predetermined distance is a residual value between the first image distance and a secondary image distance corresponding to a secondary object distance;
marking a line representing a first required modulation transfer function value and a line representing a secondary required modulation transfer function value;
determining whether the first modulation transfer function curve intersects the first required modulation transfer function value line and whether the secondary modulation transfer function curve intersects the secondary required modulation transfer function value line to determine whether the first modulation transfer function value is not less than the first required modulation transfer function value and not less than the secondary required modulation transfer function value;
in response to determining at least one of that the first modulation transfer function value is less than the first required modulation transfer function value and that the first modulation transfer function value is less than the secondary required modulation transfer function value, determining that the lens is unsatisfactory;
in response to determining that the first modulation transfer function value is not less than the first required modulation transfer function value and not less than the secondary required modulation transfer function value, determining whether the secondary modulation transfer function curve intersects the first modulation transfer function curve;
in response to determining that the secondary modulation transfer function curve intersects the first modulation transfer function curve, defining an intersected area as an intersection of areas under the first and secondary modulation transfer function curves, and determining whether the first required modulation transfer function value line and the secondary required modulation transfer function value line both intersect the intersected area;
in response to determining that the first required modulation transfer function value line and the secondary required modulation transfer function value line both intersect the intersected area, determining an ideal range of positions of the lens relative to the image sensor in accordance with a portion of the intersected area that lies between the first and secondary modulation transfer function curves and the greater of the first and secondary required modulation transfer function value lines.

8. The method of claim 7, wherein the object comprises a plurality of line pair patterns, and each of the line pair patterns comprises alternating black and white lines.

9. The method of claim 7, wherein each of the secondary modulation transfer function values is obtained by micro-moving the lens frontward or backward to a deviated focus state.

10. The method of claim 7, wherein the first modulation transfer function value and each of the plurality of secondary modulation transfer function values are calculated from a modulation transfer function performed by a computer coupled to the image sensor.

11. The method of claim 7, wherein the residual value between the first image distance and the secondary image distance is less than one twentieth of a known focal length of the lens.

12. The method of claim 7, wherein each of the first image distance and the secondary image distance is calculated according to the formula: $1U+1/V=1/F$, where V is the first image distance or the secondary image distance, U is the corresponding first object distance or secondary object distance, and F is a known focus parameter of the lens.

13. The method of claim 7, further comprising determining an ideal position of the lens relative to the image sensor within the ideal range of positions in accordance with an intersection point of the first and secondary modulation transfer function curves if the intersection point corresponds to a modulation transfer function value that exceeds both the first required modulation transfer function value line and the secondary required modulation transfer function value line.

* * * * *